United States Patent [19]
von Rambach et al.

[11] 3,956,270
[45] May 11, 1976

[54] β-MODIFIED AZO DYE

[75] Inventors: Leonhard von Rambach; Ewald Daubach; Bertold Honigmann, all of Ludwigshafen, Germany

[73] Assignee: BASF Aktiengesellschaft, Ludwigshafen (Rhine), Germany

[22] Filed: Oct. 4, 1973

[21] Appl. No.: 403,640

[30] Foreign Application Priority Data
Oct. 11, 1972 Germany............................ 2249739

[52] U.S. Cl................................ 260/205; 260/208; 106/288 Q
[51] Int. Cl.² ......................................... C09B 46/00
[58] Field of Search........................... 260/205, 208; 106/288 Q

[56] References Cited
UNITED STATES PATENTS

| | | | |
|---|---|---|---|
| 3,004,821 | 10/1961 | Gano | 260/191 X |
| 3,124,565 | 3/1965 | Schilling et al. | 260/208 X |
| 3,169,955 | 2/1965 | Siebert et al. | 260/208 X |
| 3,207,748 | 9/1965 | Bossard et al. | 260/204 |

FOREIGN PATENTS OR APPLICATIONS

| | | | |
|---|---|---|---|
| 1,113,060 | 5/1968 | United Kingdom | 260/208 |
| 1,220,824 | 7/1962 | Germany | 260/205 |

*Primary Examiner*—Charles F. Warren
*Attorney, Agent, or Firm*—Johnston, Keil, Thompson & Shurtleff

[57] ABSTRACT

A new β-modification of the dye of the formula:

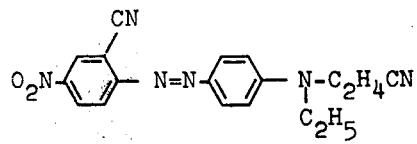

which is eminently suitable for dyeing polyesters in particular and which is surprisingly more stable under dyeing conditions than the modification already known.

1 Claim, 2 Drawing Figures

β-MODIFIED AZO DYE

Figure 1:
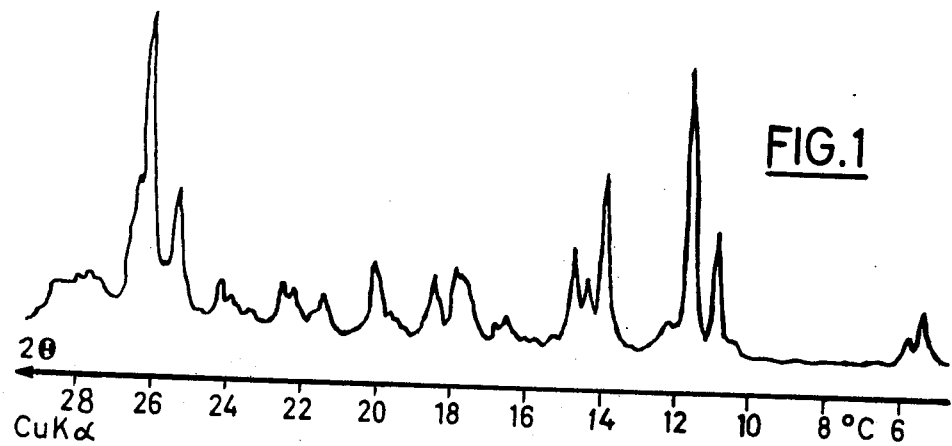

The invention relates to a β-modification of the dye of the formula:

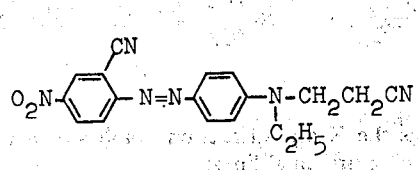

which is characterized by the X-ray diffraction graph shown in FIG. 1, which graph exhibits the following principal lines:

| angle 2 H : | 10.99 | 11.72 | 14.00 | 14.79 | 25.35 | 26.25 | 26.50 |
|---|---|---|---|---|---|---|---|
| intensity in %: | 44 | 98 | 60 | 35 | 42 | 100 | 43. |

Figure 2:
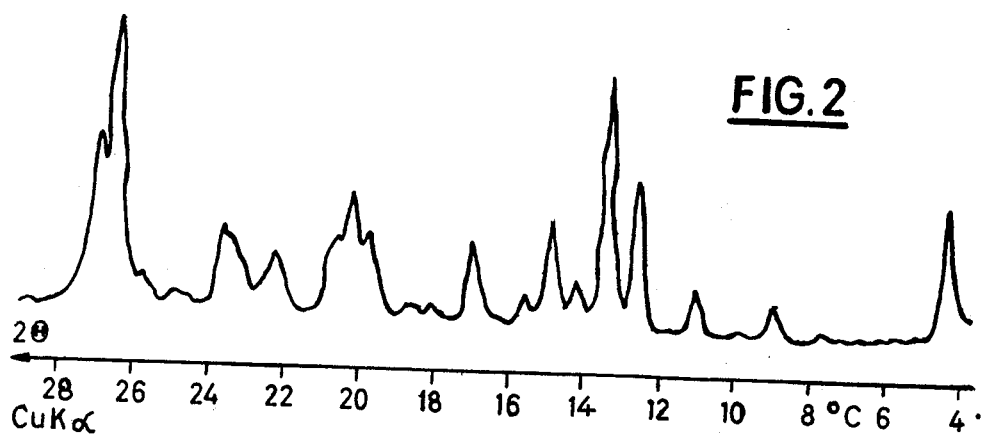

The dye may be prepared according to Example 2 of German Pat. No. 1,220,824. Hitherto it was only known in a modification α which is not suitable under all dyeing conditions and which has the X-ray diffraction graph shown in FIG. 2.

As starting material for the production of the new β-modification, it is expedient to use the press cake form of the dye prepared as described in German Pat. No. 1,220,824, and which has been suction filtered and washed with water.

The stable β-modification may be prepared for example by a. heating the press cake while stirring in aqueous suspension with or without adding an organic solvent, the dye content being from about 5 to 40%, preferably from 10 to 25%, and at a temperature of from about 60° to 130°C, preferably from 80° to 110°C, over a period of from about one to four hours; or b. grinding the press cake, preferably with the addition of a dispersant, at elevated temperature, expediently of from about 60° to 100°C, particularly of from 70° to 90°C.

Examples of organic solvents which may be added in method (a) are alcohols such as ethanol, n-propanol, isopropanol, n-butanol, isobutanol or tert-butanol; ethers such as tetrahydrofuran or dioxane; or glycols such as ethylene glycol; or glycol ethers such as ethylene glycol monomethyl and monoethyl ether.

Examples of dispersing agents which may be added in method (b) are condensation products of naphthalenesulfonic acid and formaldehyde or of phenol and formaldehyde, ligninsulfonates and particularly modified ligninsulfonates.

Suitable methods for testing whether the desired modification change is fully complete and the crystals are of adequate size are the taking of X-ray spectra and examination of samples under the microscope or electron microscope.

Stagewise conversion of the unstable modification into the modification according to the invention may be monitored particularly well by means of X-ray diffraction spectra.

The new modification according to the invention prepared by the method (a) or (b) may be converted into a very fine state of subdivision in the same manner as the prior art unstable modification by conventional mechanical methods in the presence or absence of suitable dispersants and conventional additives such as antifreeze agents, buffer substances, protective colloids or small amounts of solvent. Conventional apparatus such as mills, for example ball mills, vibrating mills, sand mills or kneaders are suitable if fine dispersion is to be effected. Examples of suitable dispersing agents are condensation products of naphthalenesulfonic acid and formaldehyde and of phenol and formaldehyde, and for example sulfite cellulose waste liquor containing ligninsulfonates, and nonionic or anionic surfactants. The conversion of the old modification into the new and the by grinding, finishing are combined in method (b) and for this reason it is preferred.

The new dye modification according to the invention which has been brought into a fine state of subdivision is eminently suitable for dyeing textile material of cellulose esters or synthetic linear polyesters such as polyethylene glycol terephthalate or polymers having an analogous chemical structure, either alone or mixed with protein or cellulose fibers at temperatures of about 100° to 200°C. The new dye modification does not have the disadvantages of the unstable modification which in dyeing processes in which it is exposed for long periods to a high temperature in an aqueous medium result in dye flocculation and filtering off. With the unstable dye modification there is the risk of marked agglomeration, flocculation and finally filtering off of the dye onto the bobbin in the dyeing of wound packages, for example cheeses. Flocculation and bleeding mainly take place when the dye liquor is only exhausted slowly or when such a large excess of dye is used that the dye liquor is never exhausted. This is the case for example in the package dyeing of loose material and in the dyeing of bobbins or yarn.

The new dye modification is stable, i.e. it does not change its crystalline structure under the conventional dyeing conditions for disperse dyes, i.e. in aqueous media at a temperature of up to about 140°C, if necessary in the presence of conventional dye auxiliaries. The crystal geometry, i.e. crystal shape and crystal size, changes only to such an extent that the tinctorial properties are not deleteriously affected.

The following examples, in which parts and percentages are by weight unless stated otherwise, illustrate the invention.

EXAMPLE 1

25 parts of water is added to 100 parts of the dye (prepared according to Example 2 of German Pat. No. 1,220,824) in the form of a press cake containing 30 parts of dye and the whole is heated with stirring for 2 hours at boiling temperature. After this treatment the original α-modification of the dye is completely converted into the new β-modification.

After the product has been finished by wet grinding, for example in a sand mill, with an addition of 70 parts of a modified ligninsulfonate, and drying, a powdered form of the dye is obtained which satisfies all application requirements. A product having similar properties after finishing is obtained when 120 parts of ethanol is added in the modification change.

EXAMPLE 2

100 parts of the dye prepared according to Example 2 of German Pat. No. 1,220,824 (in press cake form and containing 30 parts of dye) is finished by wet grinding in the presence of 70 parts of a modified linginsulfonate, for example by three passes through a sand mill, at 70°C. At the same time conversion into the new β-modification takes place. After drying a powdered form of the dye is obtained which satisfies all application requirements.

We claim:

1. The dye of the formula:

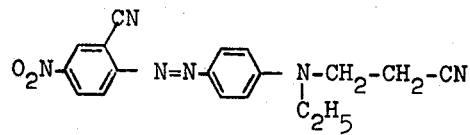

which has the X-ray diffraction graph which exhibits the following principal lines:

| angle 2 H | 10.99 | 11.72 | 14.00 | 14.79 | 25.35 | 26.25 | 26.50 |
|---|---|---|---|---|---|---|---|
| intensity in %: | 44 | 98 | 60 | 35 | 42 | 100 | 43. |

* * * * *